US 8,869,299 B2

(12) United States Patent
Charbonneau et al.

(10) Patent No.: US 8,869,299 B2
(45) Date of Patent: *Oct. 21, 2014

(54) METHOD AND SYSTEM FOR GENERATING TRUSTED SECURITY LABELS FOR ELECTRONIC DOCUMENTS

(75) Inventors: Stephane Roger Daniel Joseph Charbonneau, Manotick (CA); Edward Joseph Simon, Ottawa (CA)

(73) Assignee: Titus Inc., Ottawa (CA)

( * ) Notice: Subject to any disclaimer, the term of this patent is extended or adjusted under 35 U.S.C. 154(b) by 892 days.

This patent is subject to a terminal disclaimer.

(21) Appl. No.: 12/755,362

(22) Filed: Apr. 6, 2010

(65) Prior Publication Data
US 2010/0263060 A1 Oct. 14, 2010

Related U.S. Application Data

(63) Continuation-in-part of application No. 12/715,729, filed on Mar. 2, 2010.

(60) Provisional application No. 61/157,531, filed on Mar. 4, 2009, provisional application No. 61/167,673, filed on Apr. 8, 2009.

(51) Int. Cl.
*G06F 21/00* (2013.01)
*G06F 21/62* (2013.01)

(52) U.S. Cl.
CPC .................................. *G06F 21/62* (2013.01)
USPC ................................................ 726/27; 726/28

(58) Field of Classification Search
None
See application file for complete search history.

(56) References Cited

U.S. PATENT DOCUMENTS

| | | | |
|---|---|---|---|
| 6,609,200 B2 | 8/2003 | Anderson | |
| 6,775,689 B1 | 8/2004 | Raghunandan | |
| 6,954,532 B1 * | 10/2005 | Handley et al. | 380/54 |
| 7,346,769 B2 | 3/2008 | Forlenza | |
| 7,392,289 B2 | 6/2008 | Curry | |
| 7,467,399 B2 | 12/2008 | Nadalin | |
| 7,685,645 B2 | 3/2010 | Doyle | |
| 7,958,147 B1 | 6/2011 | Turner et al. | |
| 8,031,865 B2 * | 10/2011 | Stedron | 380/28 |
| 8,140,857 B2 * | 3/2012 | Forlenza et al. | 713/189 |
| 2001/0010052 A1 | 7/2001 | Sakamoto et al. | |
| 2003/0105734 A1 | 6/2003 | Hitchen et al. | |
| 2003/0115208 A1 | 6/2003 | Fujiwara et al. | |
| 2003/0131057 A1 | 7/2003 | Basson et al. | |
| 2004/0006598 A1 | 1/2004 | Bargagli Damm et al. | |
| 2004/0013302 A1 | 1/2004 | Ma et al. | |
| 2004/0024775 A1 | 2/2004 | Kemp | |
| 2005/0039034 A1 * | 2/2005 | Doyle et al. | 713/193 |
| 2005/0187937 A1 | 8/2005 | Kawabe et al. | |
| 2005/0251508 A1 | 11/2005 | Shimizu | |
| 2006/0075228 A1 | 4/2006 | Black et al. | |
| 2006/0085469 A1 | 4/2006 | Pfeiffer et al. | |

(Continued)

*Primary Examiner* — Benjamin Lanier
(74) *Attorney, Agent, or Firm* — IP-MEX Inc.; Victoria Donnelly

(57) ABSTRACT

A method and system for generating trusted security labels in electronic documents is disclosed. The method comprises determining parts of the document to be cryptographically bound to the security label and hashing them; hashing the security label; specifying any necessary policies as signable signature properties; and digitally signing the collection of these items. The resulting security label is trusted, because it is digitally signed and its digital signature also covers the parts of the document to be protected, thus allowing any tampering of the security label or the covered parts of the document to be detectable. A corresponding system for generating trusted security labels is also provided.

22 Claims, 12 Drawing Sheets

150

Security Classification Levels and respective Enumerated Values

| Security Classification Level | Enumerated Value (for the purposes of this patent application only) |
|---|---|
| TOP SECRET | 6 |
| SECRET | 5 |
| CONFIDENTIAL | 4 |
| PROTECTED C | 3 |
| PROTECTED B | 2 |
| PROTECTED A | 1 |
| UNCLASSIFIED | 0 |

(56) References Cited

U.S. PATENT DOCUMENTS

| | | |
|---|---|---|
| 2006/0117010 A1 | 6/2006 | Hakala |
| 2006/0224589 A1 | 10/2006 | Rowney et al. |
| 2006/0271596 A1 | 11/2006 | Sabsevitz et al. |
| 2007/0027873 A1 | 2/2007 | Factor et al. |
| 2007/0094594 A1 | 4/2007 | Matichuk et al. |
| 2007/0116281 A1 | 5/2007 | Brown |
| 2007/0136198 A1 | 6/2007 | Foth et al. |
| 2007/0174285 A1 | 7/2007 | Dutta et al. |
| 2007/0226174 A1 | 9/2007 | Saito |
| 2007/0233687 A1 | 10/2007 | Iwase |
| 2008/0062472 A1 | 3/2008 | Garg |
| 2008/0072032 A1 | 3/2008 | Cohen et al. |
| 2008/0104118 A1 | 5/2008 | Pulfer |
| 2008/0114725 A1 | 5/2008 | Indeck et al. |
| 2008/0168135 A1 | 7/2008 | Redlich et al. |
| 2008/0229428 A1 | 9/2008 | Camiel |
| 2008/0244710 A1 | 10/2008 | Foti |
| 2008/0270807 A1 | 10/2008 | Forlenza |
| 2008/0300850 A1* | 12/2008 | Chen et al. ............... 703/22 |
| 2008/0301482 A1* | 12/2008 | Goff ......................... 713/323 |
| 2008/0301760 A1 | 12/2008 | Lim |
| 2009/0006851 A1 | 1/2009 | Freeman |
| 2009/0019379 A1 | 1/2009 | Pendergast |
| 2009/0030884 A1 | 1/2009 | Pulfer |
| 2009/0106271 A1 | 4/2009 | Chieu et al. |
| 2009/0254572 A1 | 10/2009 | Redlich et al. |
| 2009/0296166 A1 | 12/2009 | Schrichte |
| 2010/0030798 A1 | 2/2010 | Kumar et al. |
| 2010/0153167 A1* | 6/2010 | Kretzschmar et al. ........ 705/9 |
| 2010/0174751 A1 | 7/2010 | Kawano et al. |
| 2010/0185676 A1 | 7/2010 | Weaver et al. |
| 2010/0313239 A1 | 12/2010 | Chakra et al. |
| 2011/0035421 A1 | 2/2011 | Laird-McConnell |
| 2011/0202618 A1 | 8/2011 | Kritt et al. |

* cited by examiner

Security Classification Levels and respective Enumerated Values

| Security Classification Level | Enumerated Value (for the purposes of this patent application only) |
|---|---|
| TOP SECRET | 6 |
| SECRET | 5 |
| CONFIDENTIAL | 4 |
| PROTECTED C | 3 |
| PROTECTED B | 2 |
| PROTECTED A | 1 |
| UNCLASSIFIED | 0 |

```
<SecurityLabel xmlns="http://www.nc3a.nato.int/2006/09/xmlslab#">
 <LabeledObjectGroup Id="84b19e9e-3447-4834-8c67-67ffd4587775">
  <ConfidentialityLabel>
   <SecurityPolicyIdentifier URI="urn:oid:1.3.26.0.4406.0.5.0">
    gc.ca
   </SecurityPolicyIdentifier>
   <SecurityClassification URI="urn:oid:1.3.26.0.4406.0.6.5">
    SECRET
   </SecurityClassification>
  </ConfidentialityLabel>
 </LabeledObjectGroup>
</SecurityLabel>
```

METHOD AND SYSTEM FOR GENERATING TRUSTED SECURITY LABELS FOR ELECTRONIC DOCUMENTS

CROSS REFERENCE TO RELATED APPLICATIONS

The present application is a Continuation-in-Part of the U.S. patent application Ser. No. 12/715,729 filed on Mar. 2, 2010 for "Method And System For Classifying And Redacting Segments Of Electronic Documents", which claims benefit from the U.S. provisional application 61/157,531 for "Methods for Classifying and Redacting Portions in Email Message" filed on Mar. 4, 2009; the present application also claims benefit from the U.S. provisional application Ser. No. 61/167,673 for "Trusted Security Labels for Software Documents" filed on Apr. 8, 2009, the entire contents of the above noted applications are incorporated herein by reference.

FIELD OF THE INVENTION

The invention generally relates to security in document management systems, and in particular to a method and system for generating trusted security labels in electronic documents.

BACKGROUND OF THE INVENTION

Electronic documents that include Word, Power Point and Excel files generated by employees in an organization often contain sensitive information that should be made available to only a selected set of recipients with a security classification level that is appropriates for viewing the information contained in the document. A document or its parts are associated with a certain security classification level whereas each recipient belongs to a security classification domain that determines the security classification levels of the documents that the recipient is allowed to receive. Consider for example a Word file that has a security classification level of "CLASSIFIED". It can thus be viewed only by persons in a security classification domain with a security classification level that is equal to higher then "CLASSIFIED".

Protecting electronic documents and ensuring that only authorized persons are given access to sensitive information contained in the documents is critically important to the appropriate functioning of the organization. Controlling document access based on the security classification level of the document has a number of advantages that include the following.

It reduces disclosure of sensitive information to unauthorized persons;

It facilitates the enforcement of policies regulating document distribution for the organization;

It enables the use of security technology to prohibit the "leaking" of the document to a recipient that does not have the authorization to view the information contained in the document.

While existing document management systems have various features developed over a number of years, the problem of classified documents leaking into another security classification domain that does not include (or permit) the security classification level assigned to the document still exists. Therefore, there is a need in the industry for developing an improved method and system for introducing trusted security labels in electronic documents.

SUMMARY OF THE INVENTION

There is an object of the invention to provide an improved method and system for generating trusted security labels for documents, which would avoid or mitigate shortcomings of the prior art.

According to one aspect of the invention, there is provided a computerized method for generating a trusted security label for an electronic document for protecting the electronic document from unauthorized access, the method comprising:

(a1) determining a part of the document to be protected;

(b1) selecting a security label associated with the part of the document, and indicating a security classification level for the part of the document from a predetermined list of security labels;

(c2) specifying one or more policies governing generation of the trusted security label based on the part of the document and the security label; and (d1) generating the trusted security label, including digitally signing the part of the document, the security label and said one or more policies.

The step (a1) further comprises applying a hash function to the part of the document. The step (b1) further comprises applying a hash function to the security label. The step (c1) comprises specifying a policy for identifying the part of the document to be protected.

In the embodiments of the invention, the step of digitally signing comprises cryptographically binding the part of the document to the security label.

Additionally, the step (c1) may comprise specifying a policy for verifying an identity of a person applying the trusted security label.

The method further comprises matching the security classification level of the part of the document with a security classification level of a recipient of the document.

The method described above is suitable for processing documents in an Open Office Extensible Markup Language (OOXML) format, Microsoft Office document, or documents in other formats.

According to another aspect of the invention, there is provided a computer readable storage medium, having a computer readable program code instructions stored thereon, which, when executed by a processor, performs the following:

(a10) determining a part of the document to be protected;

(b10) selecting a security label associated with the part of the document, and indicating a security classification level for the part of the document from a predetermined list of security labels;

(c10) specifying one or more policies governing generation of the trusted security label based on the part of the document and the security label; and (d10) generating the trusted security label, including digitally signing the part of the document, the security label and said one or more policies.

According to yet another aspect of the invention, there is provided a system for generating a trusted security label for an electronic document for protecting the electronic document from unauthorized access, the system comprising:

a processor, and a computer readable storage medium having computer readable instructions stored thereon, which, when executed by the processor, form the following:

(a11) a part determination module determining a part of the document to be protected;

(b11) a selection module selecting a security label associated with the part of the document, and indicating a security classification level for the part of the document from a predetermined list of security labels;

(c11) a policy module specifying one or more policies governing generation of the trusted security label based on the part of the document and the security label; and (d11) a label generation module generating the trusted security label, including digitally signing the part of the document, the security label and said one or more policies.

The part generation module (a11) further comprises a first hash application module applying a hash function to the part of the document. The selection module (b12) further comprises a second hash application module applying a hash function to the security label. The policy module (c11) comprises computational means for specifying a policy for identifying the part of the document to be protected. The label generation module (d11) comprises a signature module cryptographically binding the part of the document to the security label. The policy module (c11) comprises computational means for specifying a policy for verifying an identity of a person applying the trusted security label.

The system further comprises a guard device matching the security classification level of the part of the document with a security classification level of a recipient of the document.

In the embodiments of the invention, the system comprises computational means for providing the document in an Open Office Extensible Markup Language (OOXML) format, or for providing a Microsoft Office document. It is also understood that other types of documents may be also processed by the system of the embodiments of the invention.

In the system described above, the processor is a multicore processor with each of the part detection module, the selection module, the policy module and the label generation module running on a separate core.

Thus, an improved system and method for generating trusted security labels for electronic documents have been provided.

BRIEF DESCRIPTION OF THE DRAWING

Further features and advantages of the invention will be apparent from the following description of the embodiment, which is described by way of example only and with reference to the accompanying drawings, in which.

DETAILED DESCRIPTION OF THE EMBODIMENTS OF THE INVENTION

Glossary

Figure 1A:
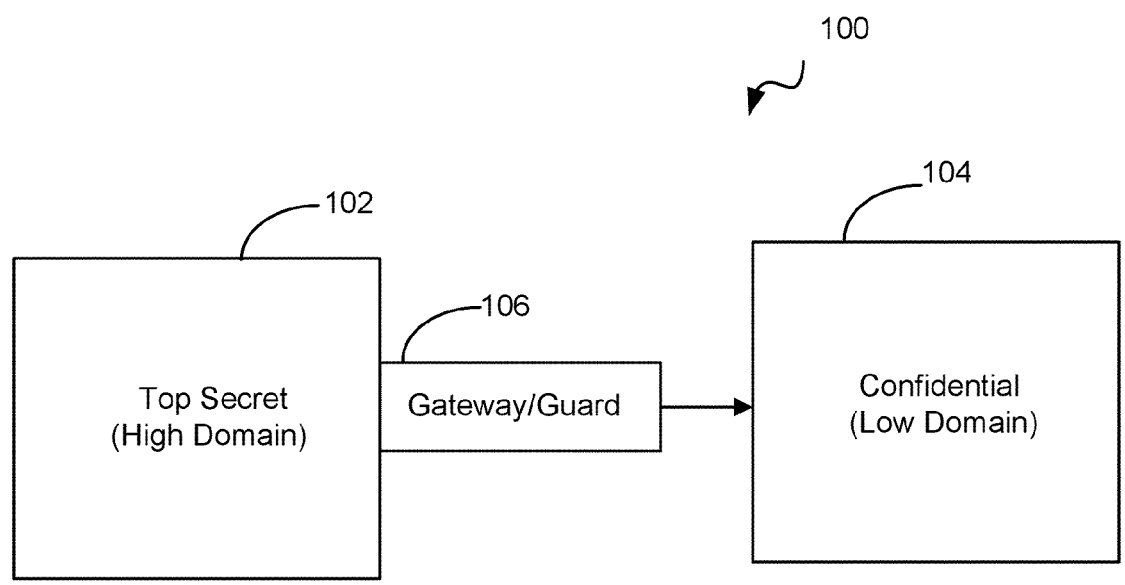
FIG. 1(a) illustrates securely sharing information between security classification domains.

Policy governs generation of the trusted security label based on the part of the document and the security label.

| | |
|---|---|
| Security classification level document | characterizes the degree of security associated of a with a part of the document. |
| Security classification level a security classification domain | highest security classification level for a document of that is accessible within the security classification domain. |
| Security label | indicates a security classification level for the part of the document to be protected. |
| Trusted security label | digitally signed part of the document, security label and policies. |
| OOXML | Open Office Extensible Markup Language |
| OPC | Open Packaging Conventions |

Embodiments of the present invention reliably and securely prevent classified electronic documents in a given security classification domain from leaking into another security classification domain that does not include (or accept) the security classification level assigned to the document. Thus, the document is protected from unauthorized access.

The embodiments of the invention enable the generation of a trusted security label for an openly available electronic document, e.g., the Microsoft Office 2007 document that includes Word, Excel, and PowerPoint files, the trusted security label protecting the document without disrupting the use of that document in out-of-the-box office software. The resulting trusted security label is cryptographically bound to the document. The security label is trusted, because it is digitally signed and its digital signature also covers the parts of the document so labeled, thus allowing any tampering of the security label or the parts of the document to be detectable. The selection of the parts of the document to be protected by the security label, which may include all the parts of the document, is set through a policy referenced or embedded as a property of the digital signature.

Though use of the document within out-of-the-box software is not impeded by the trusted security label, the trusted security label remains processable by devices such as a Gateway/Guard, which prevent classified documents from leaking into inappropriate security classification domains. This is discussed further in a later part of this application.

Before describing the details of the embodiments of the invention the basic concepts that underlie these embodiments are discussed. The methods of the invention generate a digitally signed trusted security label for the document to provide the document with protection from unauthorized access. A security label that is not digitally signed is prone to tampering. A malicious user for example can change the security classification level of the document from TOP SECRET to SECRET to allow the document to leak into a SECRET security classification domain. Similarly, if the signature associated with the security label does not cover the parts of the document being protected, it may be possible to insert information (at creation time or during transit) that corresponds to a higher security classification domain into the document without invalidating this signature. The importance of binding both the security label and the parts of the document it covers within one signature is this crucial and is implemented in the embodiment of the invention.

Figure 1B:
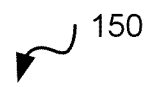
FIG. 1(b) displays a table 150 presenting the enumerated values for various security classification levels.

Consider the example shown in diagram 100 presented FIG. 1(*a*), in which Alice and Bob are in different security classification domains, but they need to be able to share documents. Specifically, Alice is in a security classification domain with a higher security classification level (TOP SECRET) 102 and Bob is in a security classification domain with a lower security classification level (CONFIDENTIAL) 104. Alice needs to be able to send a document to Bob. To safeguard the security of information in Alice's security classification domain, that document is provided with a trusted security label that indicates its security classification level and there is a network device, to be referred to as Gateway/Guard 106, on the security classification domain's boundary, which prevents documents with security classification levels higher than that of Bob's security classification domain from accidentally or maliciously being sent to Bob's security classification domain.

For example, if the classification levels of documents in Alice's security classification domain range from UNCLASSIFIED to TOP SECRET and those in Bob's security classification domain range from UNCLASSIFIED to CONFIDENTIAL, then Alice should be able to send documents with security classification levels up to CONFIDENTIAL to Bob, but not be able to send documents with security classification levels higher than CONFIDENTIAL, such as a TOP SECRET Excel document.

Because Alice's security classification domain has a higher security classification level than Bob's, Alice's security classification domain is referred to as the High Domain and Bob's security classification domain is referred to as the Low Domain. The Gateway/Guard 106 is a network device, or devices, which prevent a document with a security classification level higher than that the users in the Low Domain are authorized to access, from leaving the High Domain and entering the Low Domain. For the purposes of this patent application, each security classification domain and its documents use security classification levels, ordered from highest to lowest illustrated in the table 150 shown in FIG. 1(*b*). The table 150 also includes the enumerated value for each security classification level that is used in comparison of the security classification levels performed at the Gateway/Guard 106.

Within the High Domain, documents are associated with security classification levels ranging from the lowest, UNCLASSIFIED, to the highest security classification level for the High Domain. In order to facilitate sharing of documents, documents may be sent from the High Domain to the Low Domain if, and only if, the enumerated value for the security classification level of the document is equal to or less than the enumerated value for the security classification level of the Low Domain. The security classification level of a security classification domain is the highest security classification level for a document that is accessible within the security classification domain. In order to ensure that this rule is followed, all documents that attempt to pass from the High Domain to the Low Domain are inspected by the Gateway/Guard 106 that determines whether the document in question is permitted to pass. This scenario is illustrated for a system 200 displayed in FIG. 2. The system 200 comprises a High Domain 204 and a Low Domain 206. The Gateway/Guard 106 is placed at the boundary of the High Domain 204. In the example scenario presented in FIG. 2, the security classification level for the High Domain 204 is $C_h$, whereas the classification level for the Low Domain 206 is $C_l$. Please note that:

$$C_h > C_l$$

Documents with various classification levels $C_d$ are present in the High domain 204. Only those documents with security classification levels $C_d \leq C_l$ are allowed by the Gateway/Guard 106 to be accessed by users in the Low Domain 206.

Figure 2:
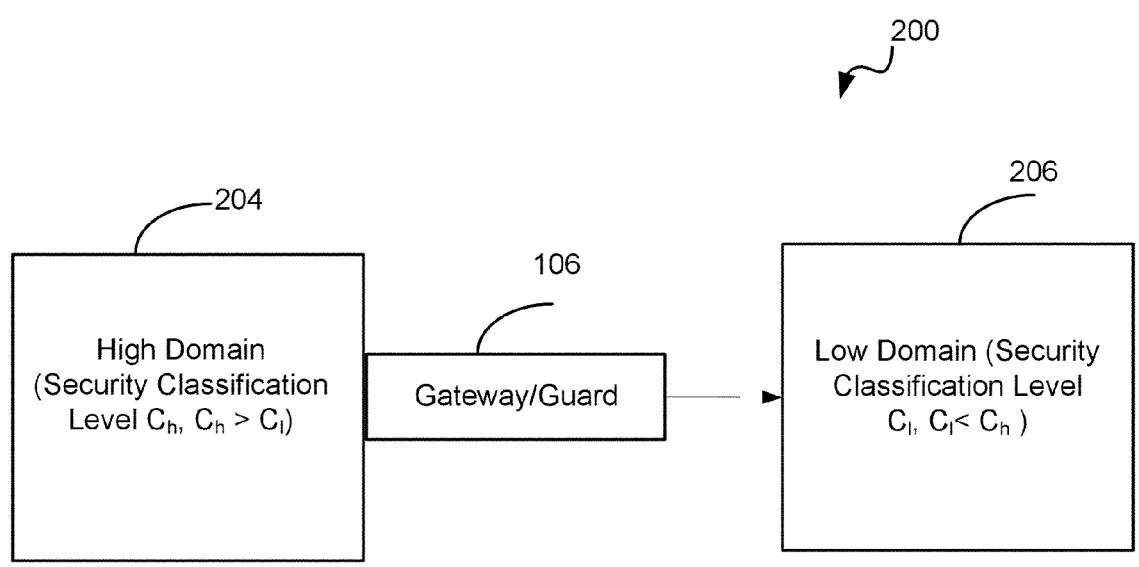
FIG. 2 illustrates a typical security classification scenario for classifying documents and inspecting the documents by a Gateway/Guard 106.

The embodiment of the invention described herein enables the system illustrated in FIG. 2 to work in a trusted manner so that information leakage is securely and reliably prevented.

Embodiments of the present invention relate to Microsoft Office 2007 documents as Microsoft Office 2007 enables a robust enterprise-wide collaboration and automation of documents through the use of a new, openly-documented data format Open Office Extensible Markup language (OOXML) that is accessible to non-Microsoft applications. A description of OOXML is provided in http://standards.iso.org/ittf/PubliclyAvailableStandards/c051459_ISOIEC%2029500-2_2008(E).zip. It is contemplated that the embodiments of the invention are also applicable to other openly-documented data formats, which are accessible by external applications.

The OOXML format that is important in the context of the invention is discussed next. OOXML defines the Open Packaging Conventions (OPC) which defines a generic structure for the different parts comprising Microsoft Word, Excel, and PowerPoint documents. To understand the generation of trusted security labels for Microsoft Office documents of the embodiment of the invention, one must be acquainted with the structure of documents conforming to OOXML's OPC. An OPC document as a whole is referred to as a "package". Inside the OPC package is a collection of parts; each part of the document constitutes a complete data stream of a given content type (e.g. a header or an image). OOXML defines the content types for parts related to Word, Excel, and PowerPoint, but OPC allows parts belonging to custom content types (e.g. a MIME type related to security classification) to be incorporated into packages as well.

Figure 3:
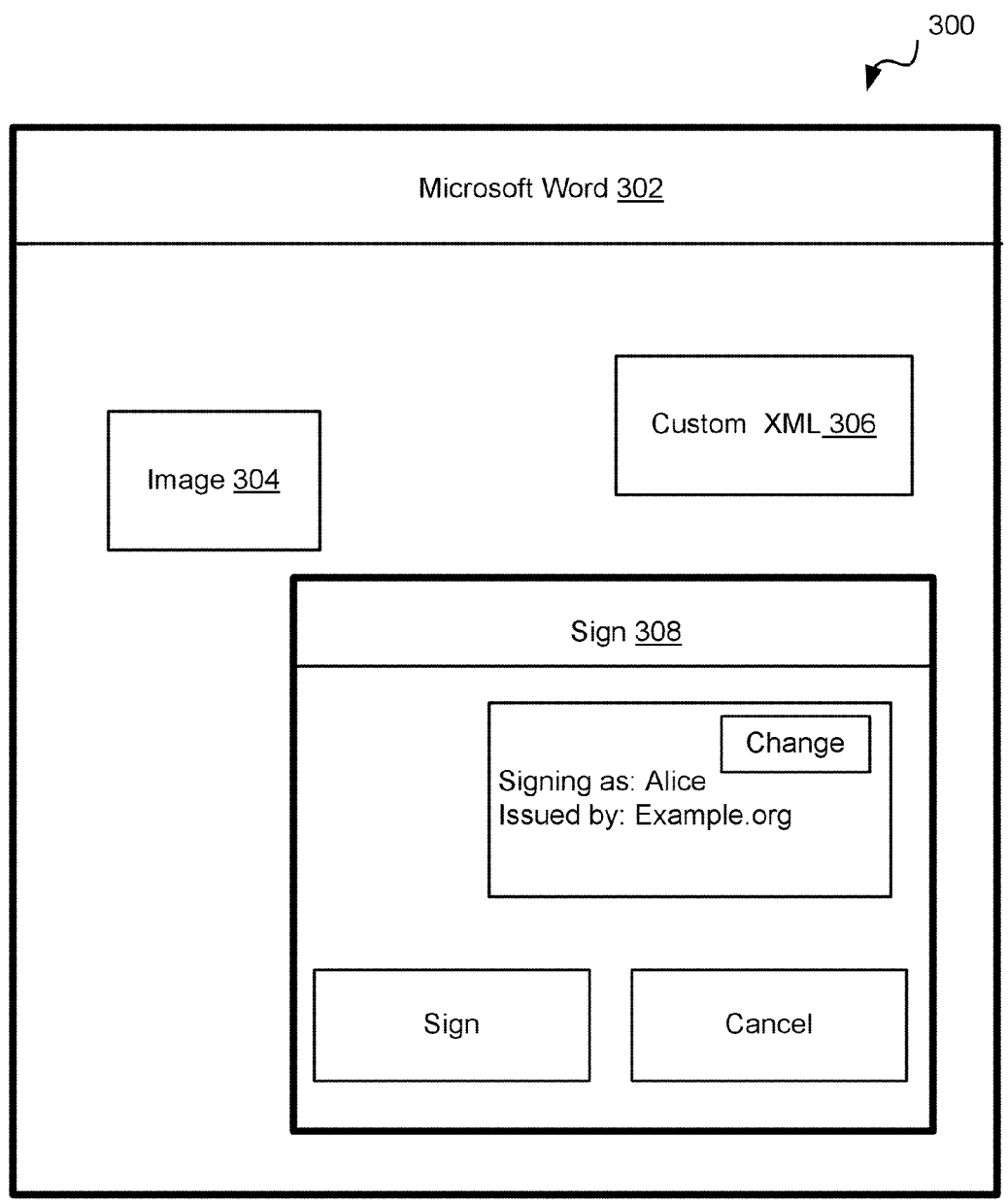
FIG. 3 illustrates a Word Document prior to applying a security label.

FIG. 3 shows an example Microsoft Word document visible within a Microsoft Word window 300. The document that needs to have a security label applied to it contains an image 304, a custom XML 306 for linking content to XML data sources, and a digital signature unrelated to the security label the details of which are captured in the "sign" window 308. Microsoft Word, Excel, and PowerPoint enable users to digitally sign documents natively within the application. The trusted security label provided in the embodiment of the present invention can coexist with such a pre-existing signature and does not break such a signature in the document. In the document shown in FIG. 3, a user named Alice is applying the digital signature, unrelated to security classification, to show that she is the author of the document.

Figure 4:
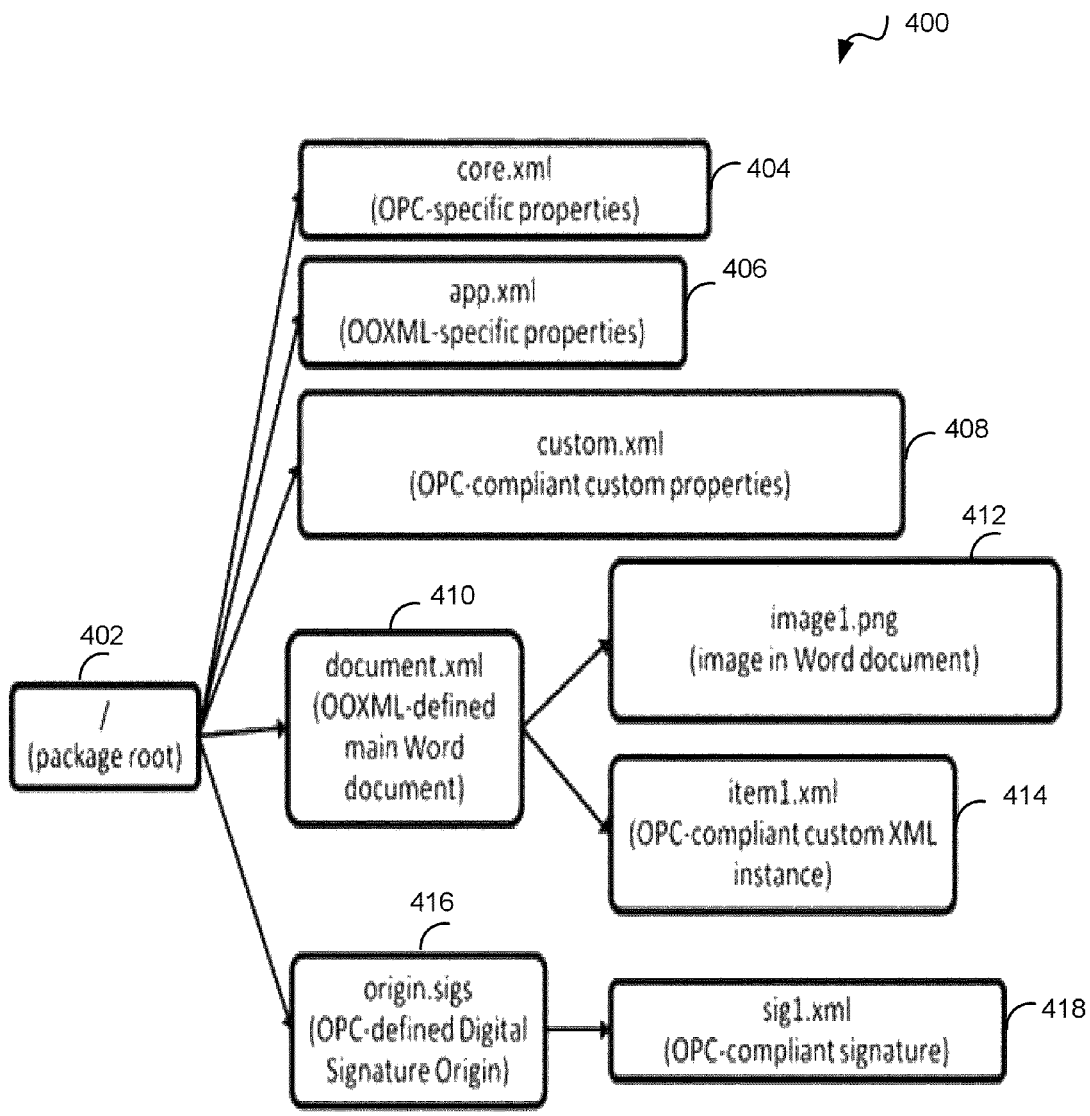
FIG. 4 illustrates an example of an Open Packaging Conventions (OPC) package for a Word Document.

FIG. 4 presents a simplified OPC package 400 containing the Word document shown in FIG. 3. In the OPC package 400, as in all OPC-compliant packages, there is a package root 402 from which stems a hierarchy of parts. The links in the hierarchy are called "relationships" in OPC and are stored in special parts called "relationships parts". This particular package contains the following parts:

core.xml 404—This includes OPC-defined core properties of the package;

app.xml 406—This includes OOXML-defined Word-specific properties of the Word document;

custom.xml 408—This includes custom properties (properties that are neither OPC or OOXML-specific) of the package;

document.xml 410—This is the main content of the Word document;

image1.png 412—This is a JPEG image in the document;

item1.xml 414—This is a custom XML instance. Custom XML is a feature of OOXML that allows OOXML-supporting applications (e.g. Word, Excel, and PowerPoint) to store data in an XML instance that adheres to custom schemas;

origin.sigs 416—This is the OPC-defined part acting as the node from which all OPC-compliant digital signatures must stem; and sig1.xml 418—This is an XML signature (unrelated to the trusted security label) that has already been placed within the package.

Providing a trusted security label to a document such as the one presented in FIG. 4 is discussed next. This requires (i) specifying a security label and then (ii) signing the security label. Each of these is described.

(i) Specifying the Security Label

Figure 5:
FIG. 5 illustrates an example of an XML Security Label.

The security label is specified as its own custom XML part with its own custom content type within the package as illustrated by a sample security label shown in FIG. 5. The sample security label 500 of FIG. 5 states that "As per NATO Security Classification Policy, the Document has a Security Classification of SECRET".

Figure 6:
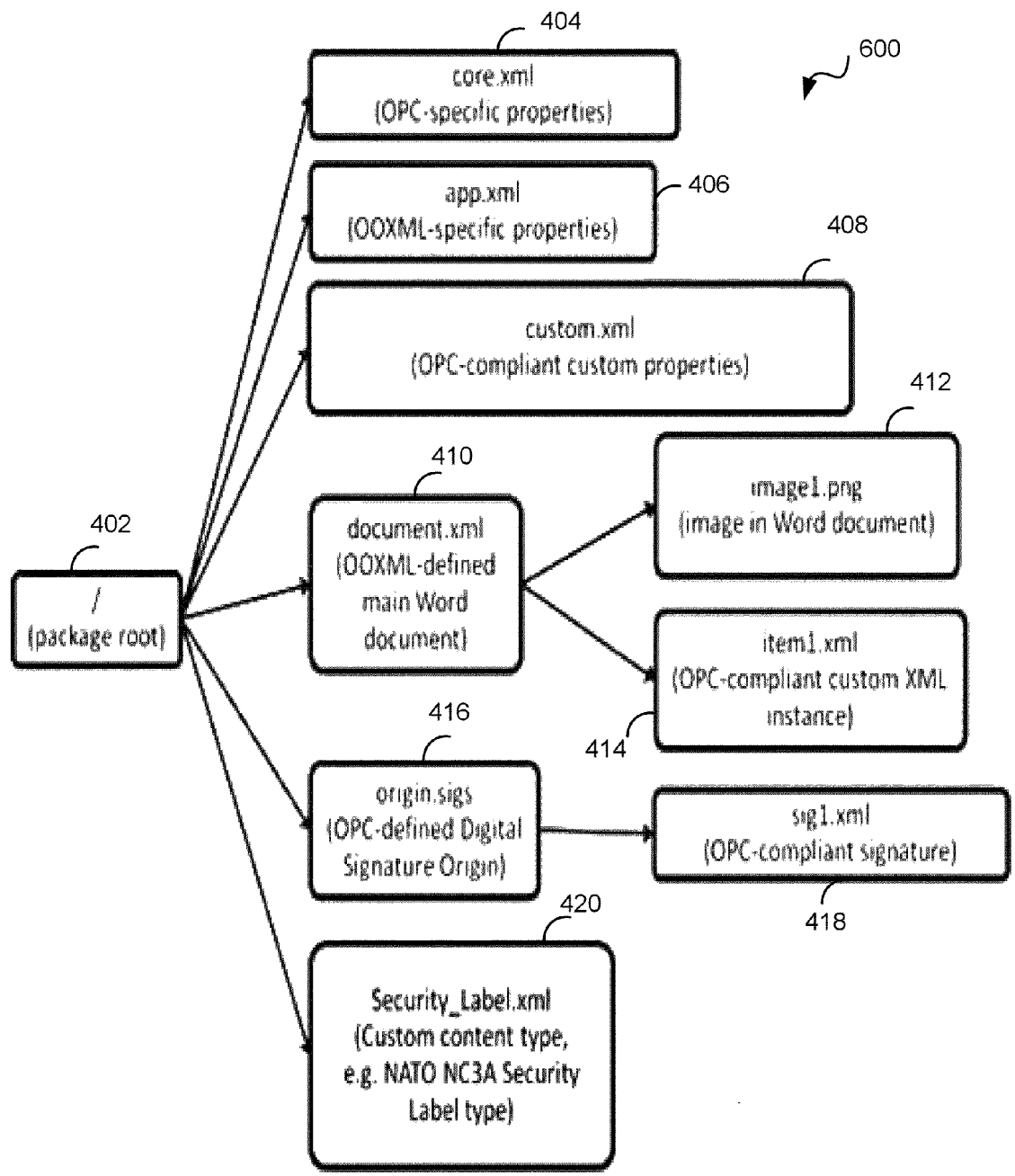
FIG. 6 illustrates an example of an OPC package with the XML Security Label.

In the embodiment of the present invention, the security label 500 is inserted into the OPC-package 400 of FIG. 4. A modified OPC-package 600 achieved after the insertion of the security label is shown in FIG. 6. The part 420 containing the security label is linked to the package root 402. At this point, the security label is not cryptographically bound to the document and can be easily altered and additional sensitive data, for example, can be added to the document by a malicious user, making the security classification level associated with the security label incorrect.

(ii) Signing the Security Label

Figure 7:
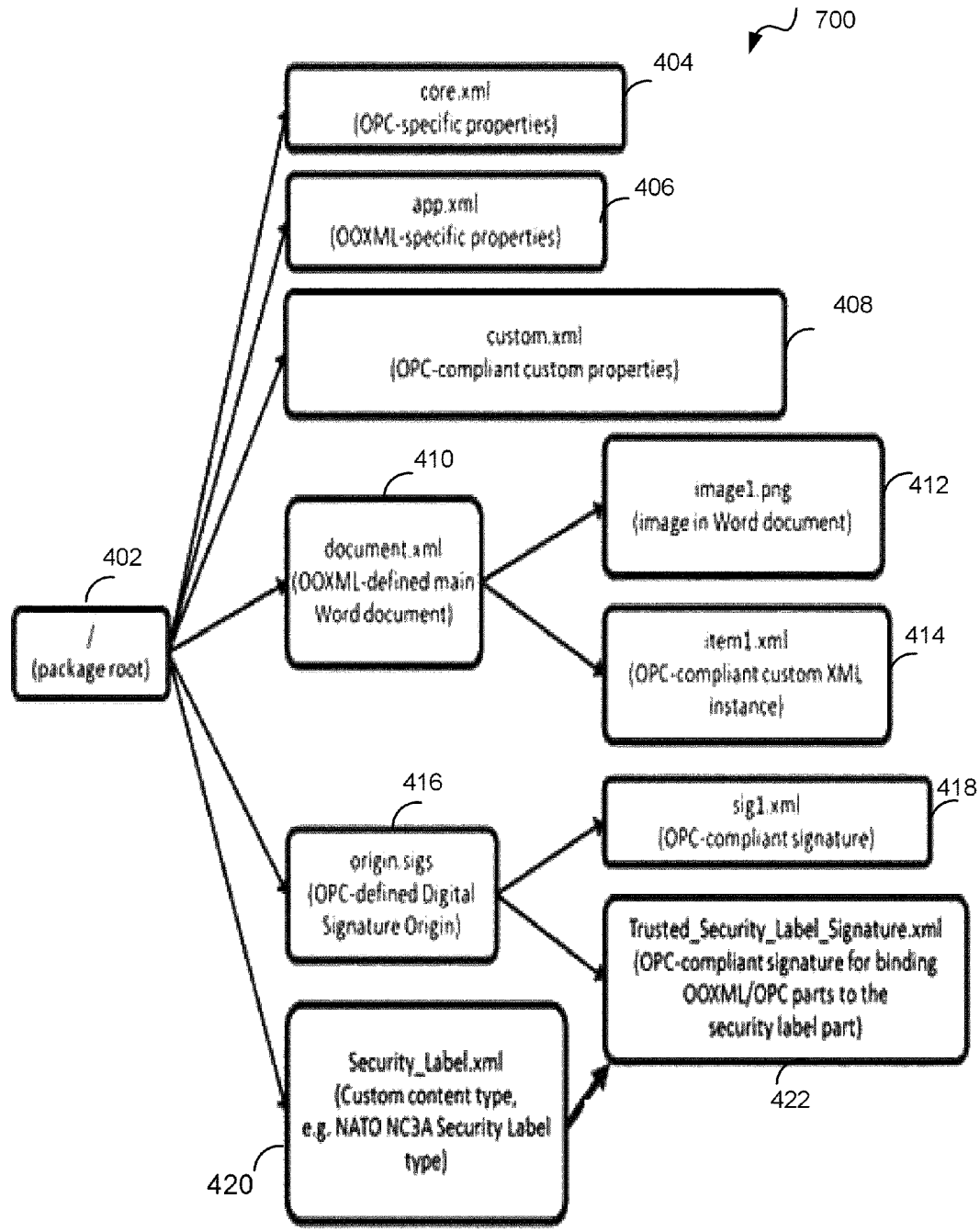
FIG. 7 shows an example of an OPC package with a trusted security label.

To generate a trusted security label, a digital signature is required. The OPC specification inherently supports digital signatures and describes how packages are to be signed and what rules applications should follow with respect to signatures. Digital signatures for the package should be rooted in the OPC-defined "digital signature origin" part (origin.sigs 416) and comply with the OPC set of rules for digital signatures. These rules are designed to ensure that different signature applications can work well with one another and that subsequent signatures added by an application, or application module, do not break existing signatures. This demonstrates that OPC recognizes the potential complexity of business processes that may be adding or removing signatures at various stages of the life cycle of the document. The modified OPC-package 700 achieved after the insertion of the trusted security label is shown in FIG. 7. The part containing the trusted security label 422 is linked to the security label 420 and to the origin.sigs 416.

To create the trusted security label, the following steps are performed by the embodiment of the invention:

Determining parts of the document, e.g. certain paragraphs within the document, of the OPC package that are to be protected by cryptographically binding to the security label and then hashing them. The selection of the parts to be cryptographically bound can either be performed by the system or configured within a policy associated with the trusted security label, such as the association of a security label with a paragraph or portion marker, or the system may simply bind the security to the whole of the document.

Selecting the security label and hashing it;

Specifying any necessary policies as signable signature properties in the OPC-package corresponding to the document. Examples of policies include a policy that requires the addition of a required policy object identifier (OID) on the signing certificate, thus ensuring that only authorized personnel can apply trusted security labels, and optionally, a policy that states that only selected Certification Authorities are to be trusted, to provide user certificates for signing trusted security labels; and Digitally signing the parts of the document, the security label and the policies, producing a trusted security label.

Once these steps have been executed, the resulting signature appears as an additional signature connected to the package's digital signature origin. If there are no pre-existing signatures, it will be the only signature. FIG. 7 shows what the OPC-package from FIG. 4 would look like after the addition of the signed security label that covers all the original parts of the package.

The system of the embodiment of the invention is described next. The system of the embodiment of the invention shown in FIG. 8 can include a general purpose or specialized computer having a CPU and a computer readable medium, e.g., memory, DVD, CD-ROM, floppy disk, flash memory, magnetic tape or other storage medium, having computer readable instructions stored thereon for execution by the CPU, which form various modules of the system as will be described in detail below. Alternatively, the system can be implemented in firmware, or combination of firmware and a specialized computer having a computer readable storage medium.

Figure 8:
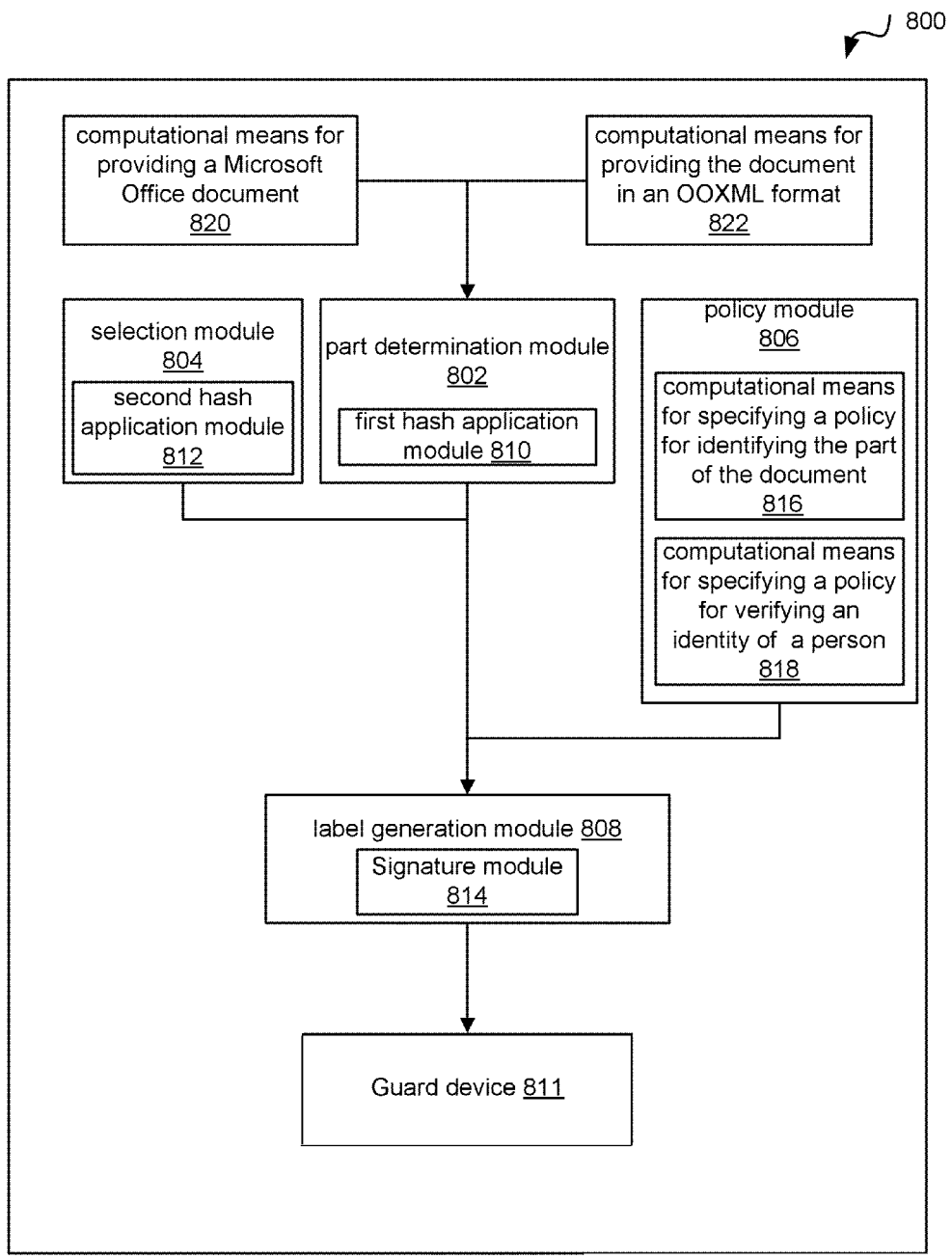
FIG. 8 shows a system 800 for generating a trusted security label.

The structure of a system 800 for providing trusted security labels to electronic documents in a document management system according to the embodiment of the invention is displayed in FIG. 8. System 800 comprises a part determination module 802, a selection module 804 and a policy module 806 each of which is connected to a label generation module 808. The part determination module 802 determines the parts of the document to be protected. The selection module 804 selects a security label associated with the parts of the document. The security label indicates a security classification level for the parts of the document from a predetermined list of security labels. The policy module 806 specifies one or more policies governing the generation of the trusted security label based on the parts of the document and the security label. The part determination module 802 receives its input from computational means for providing a Microsoft Office document 820. In another embodiment that can handle various OOXML compliant documents, the part determination module 802 receives its inputs from computational means for providing the document in an OOXML format 822. The part determination module 802 comprises a first hash application module 810 applying a hash function to the parts of the document and the selection module 804 comprises a second hash application module 812 applying a hash function to the security label. The policy module 806 in turn comprises computational means for two different policies: computational means for specifying a policy for identifying the part of the document to be protected 816 and computational means for specifying a policy for verifying an identity of a person applying the trusted security label 818. The outputs of the selection module 804, the part determination module 802 and the policy module 806 are presented to the input of the label generation module 808 that generates the trusted security label. The label generation module 808 in turn comprises a signature module 814 that generates a digital signature by binding the parts of the document and the policies to the security label. In yet another embodiment, the system 800 includes a guard device 811 that matches the security classification level of the parts of the document with a security classification level of a recipient of the document.

All the modules of the system including modules 802, 804, 806, 808, 810, 812, 814, and the guard device 811 include a firmware or, alternatively, computer readable instructions stored in a computer readable storage medium for execution by a processor. The computational means 816, 818, 820 and 822 comprise computer readable code instructions, performing methods, procedures, functions or subroutines, which are stored in a computer readable storage medium to be executed by a CPU.

Figure 9:
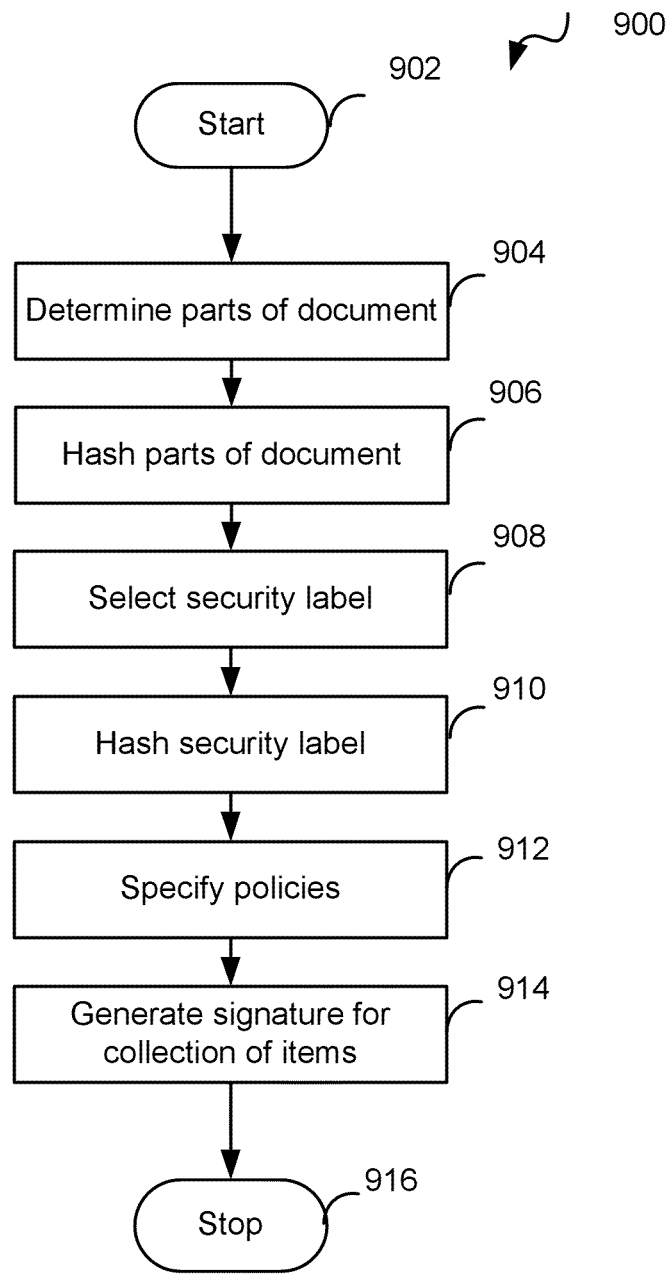
FIG. 9 shows a flowchart 900 illustrating a method for generating a trusted security label.

FIG. 9 shows a flowchart 900 illustrating a method for generating a trusted security label to electronic documents. Upon start (box 902), the procedure 900 determines parts of the document to be protected (box 904). A hash function is then applied to these parts of the document (box 906). A security label to be associated with the parts of the document, the security label indicating a security classification level for the parts of the document is then selected from a predetermined list of security labels (box 908). The procedure 900 then applies a hash function to the security label (box 910). Policies that govern the generation of the trusted security label based on the parts of the document and the security label are then specified (box 912). A digital signature that binds the collection of items that include the parts of the document, the security label and the policies is then generated (box 914), thus producing a trusted security label. After generation of the trusted security label the procedure 900 exits (box 916).

With the trusted security label in place, any tampering or changes to the security label or the parts of the document that are cryptographically bound to it will be detectable. A Gateway/Guard 106 can then inspect the trusted security label for its validity and, if valid, use the information regarding security classification level contained in it to permit or deny transfer of the document to other security classification domains.

Figure 10A:
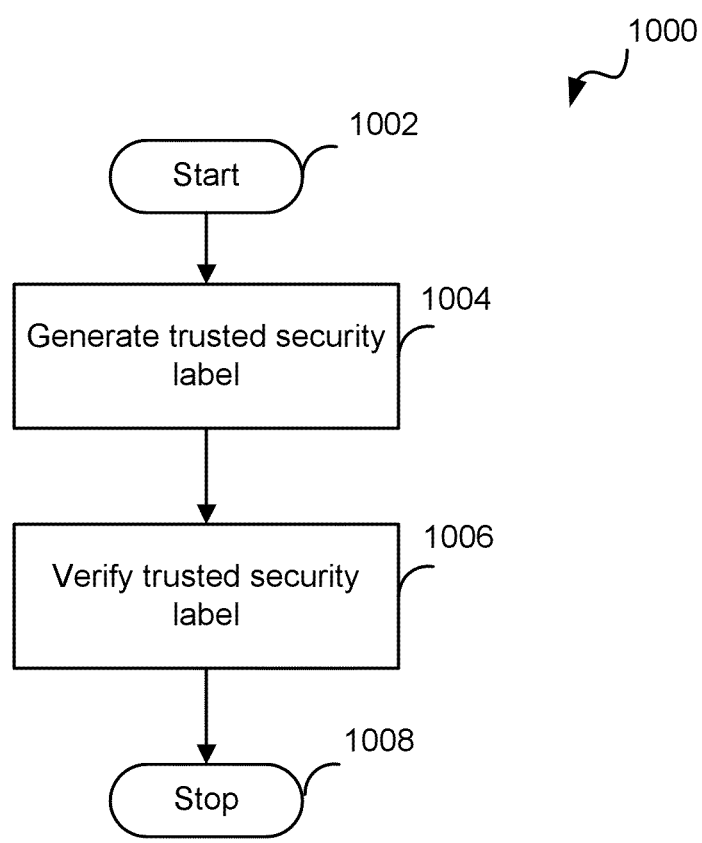
FIG. 10(a) shows a flowchart 1000 illustrating a method for generating a trusted security label for an alternate embodiment of the invention.
Figure 10B:
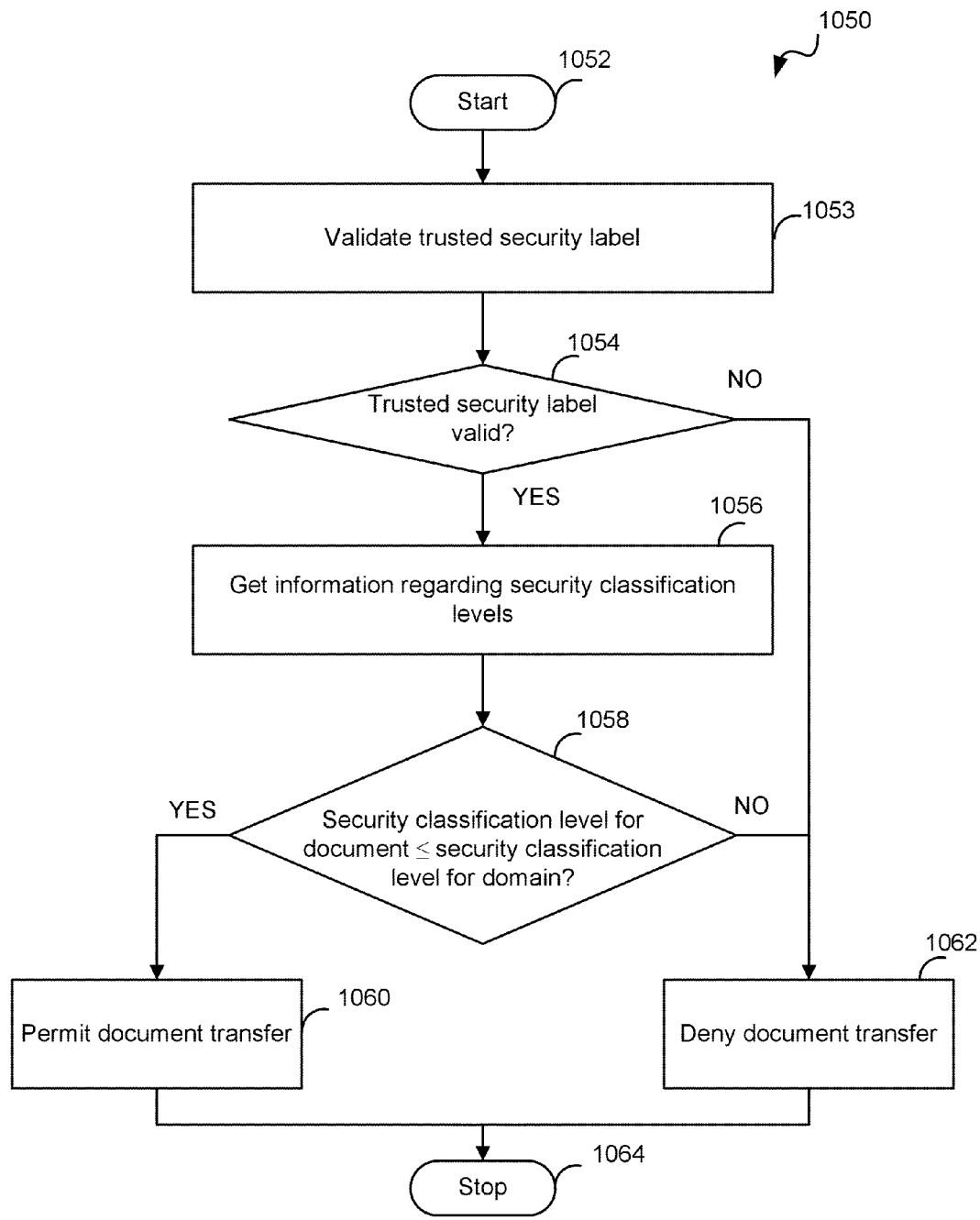
FIG. 10(b) shows a flowchart 1050 illustrating the step 1006 "Verify trusted security label" of FIG. 10(a) in more detail.

FIG. 10(*a*) shows a flowchart 1000 for a method for generating and checking a trusted security label in an alternate embodiment that performs both the generation and verification of the trusted security label. Upon start (box 1002), the procedure 1000 generates a trusted security label for the document (box 1004). The next step is to verify the trusted security label (box 1006) after which the procedure 1000 exits (box 1008). Please note that the step 1004 is performed on a client computer that sends out the document whereas the step 1008 is performed on the guard device 811. The operations performed in the step 1004 are the same as those described in the flowchart 900 presented in FIG. 9. The details of the operations performed in the step 1006 are presented in flowchart 1050 displayed in FIG. 10(*b*).

Upon start (box 1052), the procedure 1050 validates the trusted security label (box 1053). In addition to validating the trusted security label through standard verification of XML-based signatures with OOXML, the following operations need to be performed at the guard device 811 before deciding on whether or not the document should be allowed to be transferred:

Validation of any policies on the entity's verification certificate (e.g. Trusted/Authorized CAs, Trusted/Authorized Extended Key Usage field on the verification certificate of the entity that applied the Trusted Security Label, and Sender Authorization lookup);

Validation of those parts of the document that are protected by the trusted security label; and Verifying that the non-protected parts of the document package do not contain information that is not expected, for example, adding a binary blob where only text is expected, or the addition of non-standard components within the OPC.

The outcome of the validation step is inspected in box 1054 in which the procedure 1050 checks whether the trusted security label is valid. If not, the procedure exits 'NO' from box 1054, denies the document to be transferred (box 1062) and exits (box 1064). Otherwise, the procedure 1050 gets the security classifications levels for both the parts of the document and the security classification domain to which the document is to be transferred (box 1056). In the next step, the procedure 1050 checks whether the security classification level for the document is lower than or equal to the security classification level for the security classification domain (box 1058). If so, the procedure 1050 permits the document transfer (box 1060) and exits (box 1064). Otherwise, the procedure 1050 denies the document to be transferred (box 1062) and exits (box 1064).

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect. For example, the operations performed by the part detection module 802, the selection module 804, the policy module 806 and the label generation module 808 can be performed by multiple independent threads running on a multicore CPU, thus reducing the time required for generating the trusted security label. A group of documents stored in a folder can be protected as a group by providing a security label for the folder containing the documents. Although the system and method of the embodiments of the invention were illustrated with regard to the documents in Open Office Extensible Markup Language (OOXML) format and Microsoft Office documents, it is understood that various other types of documents may be also processed by the system and method of the embodiments of the invention.

Although the embodiments of the invention have been described in detail, it will be apparent to one skilled in the art that variations and modifications to the embodiments may be made within the scope of the following claims.

What is claimed is:

1. A computerized method for classifying and redacting a document having a security label, for distributing to multiple recipients having different security levels, the method comprising:

using a processor for:

selecting a segment of the document;

automatically analyzing contents of the selected segment in real time by using an artificial intelligence (AI) system;

automatically classifying the segment based on results of the analysis performed by the AI system, and further comprising:

generating a security label associated with the segment of the document, comprising providing a first reference to a security classification level of the segment of the document, wherein the first reference is stored internal to the document, and the security classification level is stored external to the document;

automatically marking the segment in accordance with a respective classification option, producing a marked segment;

automatically classifying the document based on classifications of segments of the document;

automatically redacting the document in real time in accordance with a respective clearance level of a recipient of the document, producing a redacted document, comprising arranging recipients of the document in a hierarchy in accordance with respective clearance levels such that a recipient with a higher clearance level occupies a higher level in the hierarchy in comparison to a recipient with a lower clearance level; and automatically distributing the redacted document to the recipients of a particular level in the hierarchy concurrently with the redacting marked segments of the recipients at the immediate lower level in the hierarchy.

2. The method of claim 1, wherein the automatically classifying further comprises providing a second reference to a security policy, wherein the second reference is stored internal to the document, and the security policy is stored external to the document.

3. The method of claim 2, further comprising:
(i) generating the security label according to the security policy comprising digitally signing the segment of the document, the security label, and the security policy;
(ii) binding the security label to the document; and
(iii) digitally signing the document, thereby providing a secure document.

4. The method of claim 3, wherein the steps (i), (ii), and (iii) are performed in parallel by separate cores of a multicore processor.

5. The method of claim 1, wherein the first reference comprises a Universal Resource Identifier (URI), comprising a Universal Resource Name (URN) or a policy Object Identifier (OID).

6. The method of claim 1, wherein the automatically redacting is performed concurrently with writing the document by a sender of the document.

7. The method of claim 1, wherein the automatically analyzing and the automatically redacting are performed by using two threads in a multicore processor environment.

8. The method of claim 1, wherein the redacting comprises removing or excluding the segment.

9. The method of claim 1, wherein the automatically analyzing comprises analyzing a newly typed string of characters of the segment in real time in the context of the previously entered content of the segment.

10. The method of claim 1, wherein the AI is a decision tree AI system, comprising decision nodes and conclusion nodes, each decision node having outcomes connecting the decision node to another decision node or to the conclusion node.

11. The method of claim 1, wherein the document is formatted in Extensible Markup Language (XML) format.

12. A system method for classifying and redacting a document having a security label, for distributing to multiple recipients having different security levels, the method comprising:
a processor, and a non-transitory computer readable storage medium having computer readable instructions stored thereon for execution by the processor, the processor being configured to:
select a segment of the document;
automatically analyze contents of the selected segment in real time by using an artificial intelligence (AI) system;
automatically classify the segment based on results of the analysis performed by the AI system, and further generate a security label associated with the segment of the document, comprising providing a first reference to a security classification level of the segment of the document, wherein the first reference is stored internal to the document, and the security classification level is stored external to the document;
automatically mark the segment in accordance with a respective classification option, producing a marked segment;
automatically classify the document based on classifications of segments of the document;
automatically redact the document in real time in accordance with a respective clearance level of a recipient of the document, producing a redacted document, comprising
arranging recipients of the document in a hierarchy in accordance with respective clearance levels such that a recipient with a higher clearance level occupies a higher level in the hierarchy in comparison to a recipient with a lower clearance level; and
automatically distribute the redacted document to the recipients of a particular level in the hierarchy concurrently with the redacting marked segments for the recipients at the immediate lower level in the hierarchy.

13. The system of claim 12, wherein the processor is further configured to provide a second reference to a security policy, wherein the second reference is stored internal to the document, and the security policy is stored external to the document.

14. The system of claim 13, wherein the processor is further configured to:
(i) generate the security label according to the security policy comprising digitally signing the segment of the document, the security label, and the security policy;
(ii) bind the security label to the document; and
(iii) digitally sign the document, thereby providing a secure document.

15. The system of claim 14, wherein the processor is configured to generate, bind and digitally sign in parallel by separate cores of a multicore processor.

16. The system of claim 12, wherein the first reference comprises a Universal Resource Identifier (URI), comprising a Universal Resource Name (URN) or a policy Object Identifier (OID).

17. The system of claim 12, wherein the processor is further configured to automatically redact concurrently with writing the document by a sender of the document.

18. The system of claim 12, wherein the processor is further configured to automatically analyze and the automatically redact by using two threads in a multicore processor environment.

19. The system of claim 12, wherein the processor is further configured to remove or exclude the segment.

20. The system of claim 12, wherein the processor is further configured to analyze a newly typed string of characters of the segment in real time in the context of the previously entered content of the segment.

21. The system of claim 12, wherein the AI is a decision tree AI system, comprising decision nodes and conclusion nodes, each decision node having outcomes connecting the decision node to another decision node or to the conclusion node.

22. The system of claim 12, wherein the document is formatted in Extensible Markup Language (XML) format.

* * * * *

UNITED STATES PATENT AND TRADEMARK OFFICE
CERTIFICATE OF CORRECTION

PATENT NO. : 8,869,299 B2  
APPLICATION NO. : 12/755362  
DATED : October 21, 2014  
INVENTOR(S) : Stephane Roger Daniel Joseph Charbonneau et al.

Page 1 of 1

It is certified that error appears in the above-identified patent and that said Letters Patent is hereby corrected as shown below:

In the Claims

Column 10, line 57, Claim 1, "(Al)" should read --(AI)--.

Column 10, line 59, Claim 1, "Al" should read --AI--.

Column 11, line 53, Claim 1, "Al" should read --AI--.

Column 12, line 3, Claim 12, "(Al)" should read --(AI)--.

Column 12, line 6, Claim 12, "Al" should read --AI--.

Column 13, line 1, Claim 21, "Al" should read --AI--.

Column 13, line 2, Claim 21, "Al" should read --AI--.

Signed and Sealed this  
Twenty-seventh Day of January, 2015

Michelle K. Lee  
*Deputy Director of the United States Patent and Trademark Office*